US012047634B2

(12) United States Patent
Liang et al.

(10) Patent No.: US 12,047,634 B2
(45) Date of Patent: Jul. 23, 2024

(54) METHOD AND SYSTEM FOR DISPLAYING AN ELECTRONIC PROGRAM GUIDE IN A BULLET SCREEN FORMAT

(71) Applicant: ARRIS Enterprises LLC, Suwanee, GA (US)

(72) Inventors: Yong Liang, Shanghai (CN); Qi Wang, Shanghai (CN); Xue-Wei Zhao, Shanghai (CN); Xiang Shen, Shanghai (CN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/229,102

(22) Filed: Apr. 13, 2021

(65) Prior Publication Data

US 2022/0021927 A1  Jan. 20, 2022

Related U.S. Application Data

(63) Continuation of application No. PCT/CN2020/102920, filed on Jul. 20, 2020.

(51) Int. Cl.
*H04N 21/431* (2011.01)
*H04N 21/44* (2011.01)
(Continued)

(52) U.S. Cl.
CPC ........... *H04N 21/4316* (2013.01); *H04N 21/44008* (2013.01); *H04N 21/4532* (2013.01); *H04N 21/4821* (2013.01)

(58) Field of Classification Search
CPC ........... H04N 21/4316; H04N 21/4821; H04N 21/4532; H04N 21/44008
See application file for complete search history.

(56) References Cited

U.S. PATENT DOCUMENTS 6,536,041 B1 * 3/2003 Knudson .............. H04N 21/235
  725/39
2004/0003402 A1 * 1/2004 McKenna, Jr. ..... H04N 21/4438
  725/46

(Continued)

FOREIGN PATENT DOCUMENTS

CN    1968366 A    5/2007
CN    101388969 A    3/2009

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued Apr. 19, 2021, by the National Intellectual Property Administration, PRC in corresponding International Application No. PCT/CN2020/102920. (9 pages).

*Primary Examiner* — Michael R Telan
(74) *Attorney, Agent, or Firm* — Panitch Schwarze Belisario & Nadel LLC

(57) ABSTRACT

Exemplary embodiments are directed to a device and method for displaying an electronic program guide. The device receives electronic program guide data and stores it in memory. The device also receives video content associated with a broadcast channel of a content provider over a network. The device combines the electronic program guide data and the video content, such that the electronic program guide content is overlaid onto the video content in a bullet screen format. The combined electronic program guide data and the video content are sent to a display device.

15 Claims, 9 Drawing Sheets

(51) Int. Cl.
*H04N 21/45* (2011.01)
*H04N 21/482* (2011.01)

(56) References Cited

U.S. PATENT DOCUMENTS

| | | | |
|---|---|---|---|
| 2004/0117831 A1* | 6/2004 | Ellis | H04N 21/6582 |
| | | | 348/E7.071 |
| 2007/0091208 A1 | 4/2007 | Kim | |
| 2009/0009424 A1* | 1/2009 | Kang | H04N 5/45 |
| | | | 345/1.3 |
| 2010/0188572 A1* | 7/2010 | Card, II | H04N 5/445 |
| | | | 348/E7.001 |
| 2010/0223640 A1* | 9/2010 | Reichardt | H04N 21/478 |
| | | | 725/51 |
| 2010/0262997 A1 | 10/2010 | Dove | |
| 2011/0145881 A1* | 6/2011 | Hartman | H04N 21/4438 |
| | | | 725/118 |
| 2012/0324507 A1* | 12/2012 | Weber | H04H 20/38 |
| | | | 725/37 |
| 2016/0277328 A1* | 9/2016 | Ishizuka | H04N 21/8547 |
| 2017/0289634 A1* | 10/2017 | E | H04N 21/4532 |
| 2020/0058270 A1* | 2/2020 | Li | H04N 21/472 |
| 2021/0168460 A1* | 6/2021 | Lee | G06F 40/157 |
| 2021/0185386 A1* | 6/2021 | Kong | H04N 21/4394 |
| 2022/0014819 A1* | 1/2022 | Liu | H04N 21/23418 |

FOREIGN PATENT DOCUMENTS

| | | |
|---|---|---|
| CN | 102082918 A | 6/2011 |
| CN | 205038432 U | 2/2016 |

\* cited by examiner

METHOD AND SYSTEM FOR DISPLAYING AN ELECTRONIC PROGRAM GUIDE IN A BULLET SCREEN FORMAT

FIELD

The present disclosure is related to the display of an electronic program guide, and particularly the display of the electronic program guide in a bullet screen format.

BACKGROUND

A bullet screen is a social media concept which allows viewers of online video content to post comments in-real time. The posted comments appear to fly across the screen like bullets. The feature has even been available in movie theaters, where patrons can text comments which are viewable to all on the theater screen. A bullet screen allows users and viewers of the video content to actively engage with others while keeping attention focused on the video content. That is the patrons do not have to look away from the screen to view the comments of friends and others who are also viewing the video content.

SUMMARY

An exemplary method for generating an electronic programming guide is disclosed, the method comprising: receiving, from a content server, electronic program guide data over a network; receiving, from the content server, a video content for a broadcast channel over the network; displaying the received video content on a display device; receiving, from a user device, a request to display of electronic program guide data on the display device; and displaying, electronic program guide data in a bullet screen format on the display device, wherein the electronic program guide data is overlaid on at least a portion of the video content.

An exemplary device for displaying an electronic program guide is disclosed, comprising: memory configure to store electronic program guide data; a first interface configured receive video content over a network; a processor configured to: combine the electronic program guide data and the video content, wherein the electronic program guide data is overlaid onto the video content in a bullet screen format, and send the video signal to a display device.

DETAILED DESCRIPTION

Exemplary embodiments of the present disclosure provide a manner displaying an electronic programming guide for computer premise equipment such as a multimedia device of set-top box in a bullet screen format. The set-top box can receive both video content and the electronic programming guide data from one or more servers of a content provider. A user can initiate a request to view the electronic programming guide on a display device at the same time the multimedia device is sending video content to the display device. When the multimedia device receives the electronic program guide request, it send a video signal to a client device for display of the electronic program guide data in a bullet screen format, such that program or video information for each channel being displayed can be overlaid on the video content and scrolled across the from one edge to another.

Figure 1:
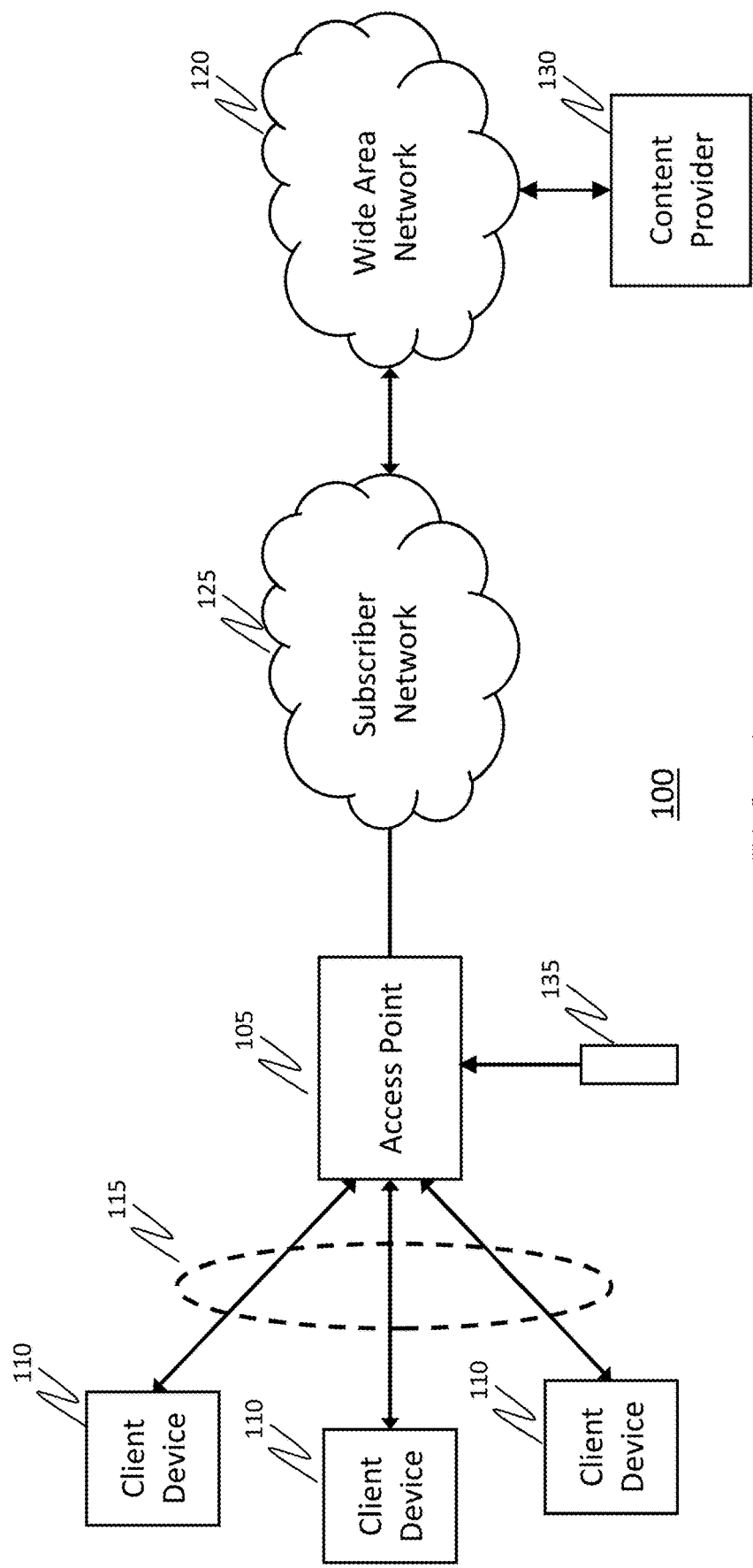
FIG. 1 is a block diagram illustrating an example network environment operable to facilitate the display of an electronic programming guide in a bullet screen format in accordance with an exemplary embodiment of the present disclosure.

FIG. 1 is a block diagram illustrating an example network environment 100 operable to facilitate the display of an electronic programming guide (EPG) in a bullet screen format in accordance with an exemplary embodiment of the present disclosure. The network environment 100 can include one or more access points 105 and one or more client devices 110. Both the access points 105 and the client devices 110 are computer premise equipment, which can be located in a home or business and connected to communicate over a local network 115. According to an exemplary embodiment, the one or more access points 105 can include a multimedia device 105 (e.g., set-top box (STB), multimedia gateway device, DLNA multimedia device, etc.) that provides multimedia content (e.g., video, data and/or voice services) to the one or more client devices 110 via the local area network 115. The multimedia device 105 can be connected to receive the multimedia content from a content provider 130 over a wide area network (WAN) 125 through a connection to a subscriber network 120 (e.g., a local area network (LAN), a wireless local area network (WLAN), a personal area network (PAN), mobile network, high-speed wireless network, etc.). Each of the communication networks can be configured to transmit and receive information over a combination of wired and wireless transmission protocols as desired. The multimedia device 105 can send requested video, data and/or voice services to a variety of types of client devices 110, including but not limited to a television, computer, tablet, mobile device, other STBs, and other devices as desired. While the access point and client devices are shown in FIG. 1 as separate devices, it should be understood that the various components can be integrated into each other.

Figure 2:
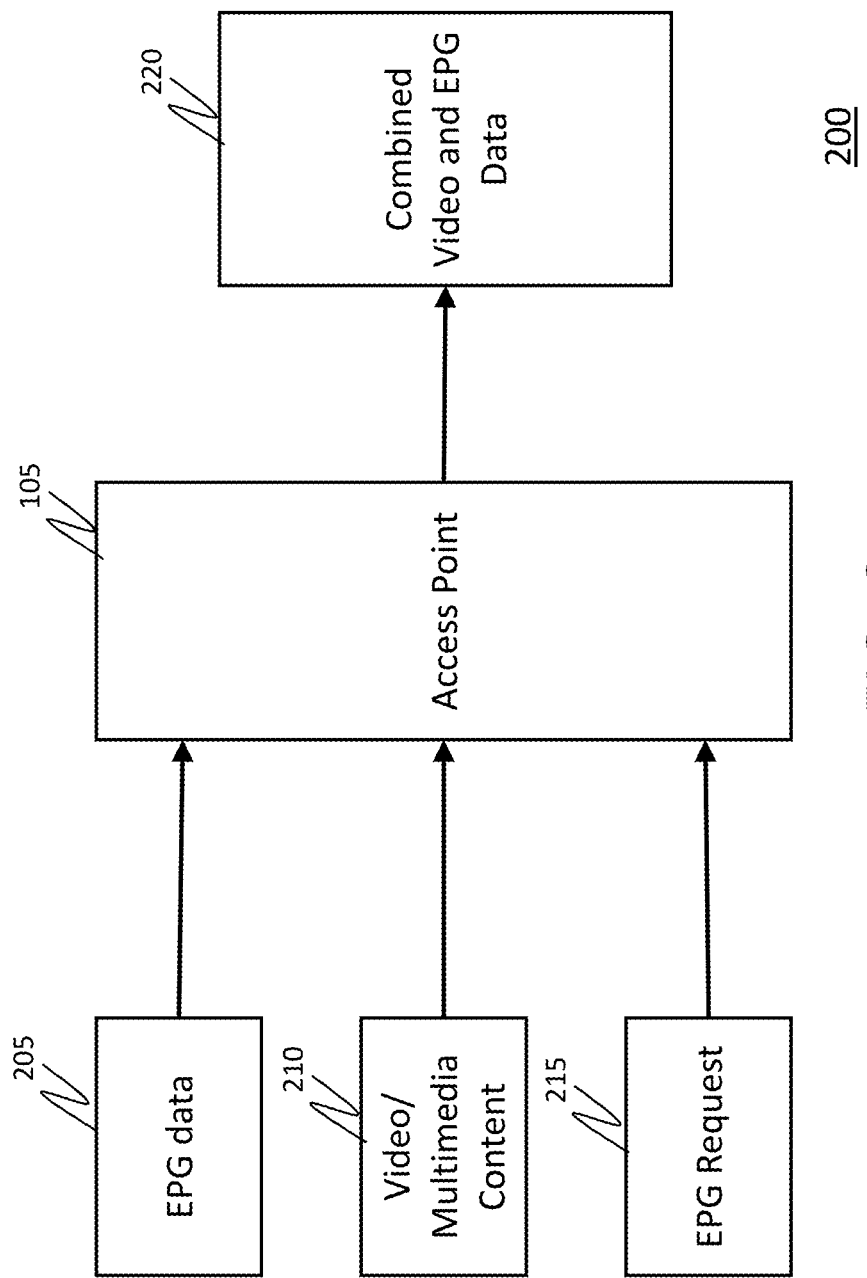
FIG. 2 illustrates an exemplary flow diagram for generating an electronic program guide in accordance with an exemplary embodiment of the present disclosure.

FIG. 2 illustrates an exemplary data flow 200 for generating an electronic program guide in accordance with an exemplary embodiment of the present disclosure. According to an exemplary embodiment of the present disclosure, the multimedia device 105 can receive, electronic programming guide data 205 from the content provider 130 over the network 120, 125 at periodic intervals. The electronic program guide data 205 can be communicated to the multimedia device 105 according to an Internet Protocol or Digital Video Broadcasting (DVB) protocol, or any other suitable communication protocol or standard as desired. As already discussed, the multimedia device 105 can receive video or multimedia content 210 over the network 120, 125 from the content provider 130. The multimedia device 105 can tune to a specified channel for receiving video content from the content provider 130 based on a user request or command initiated via an RCU 135 or other user input device connected to the multimedia device 105 or integrated into the multimedia device 105. For example, the request and/or command can be initiated by activating one or a combination of buttons or keys of the remote control unit (RCU) 135. The RCU 135 may generate a wireless signal via any suitable wireless protocol such as Bluetooth, infrared radio frequency (RF), or any other type of signal as desired. While the multimedia device is tuned to the selected channel, a user request or command 215 for displaying the EPG data 205 can be received. It should be understood that the multimedia device 105 may also receive and generate responses to other types of commands and requests from the RCU 135.

Figure 3:
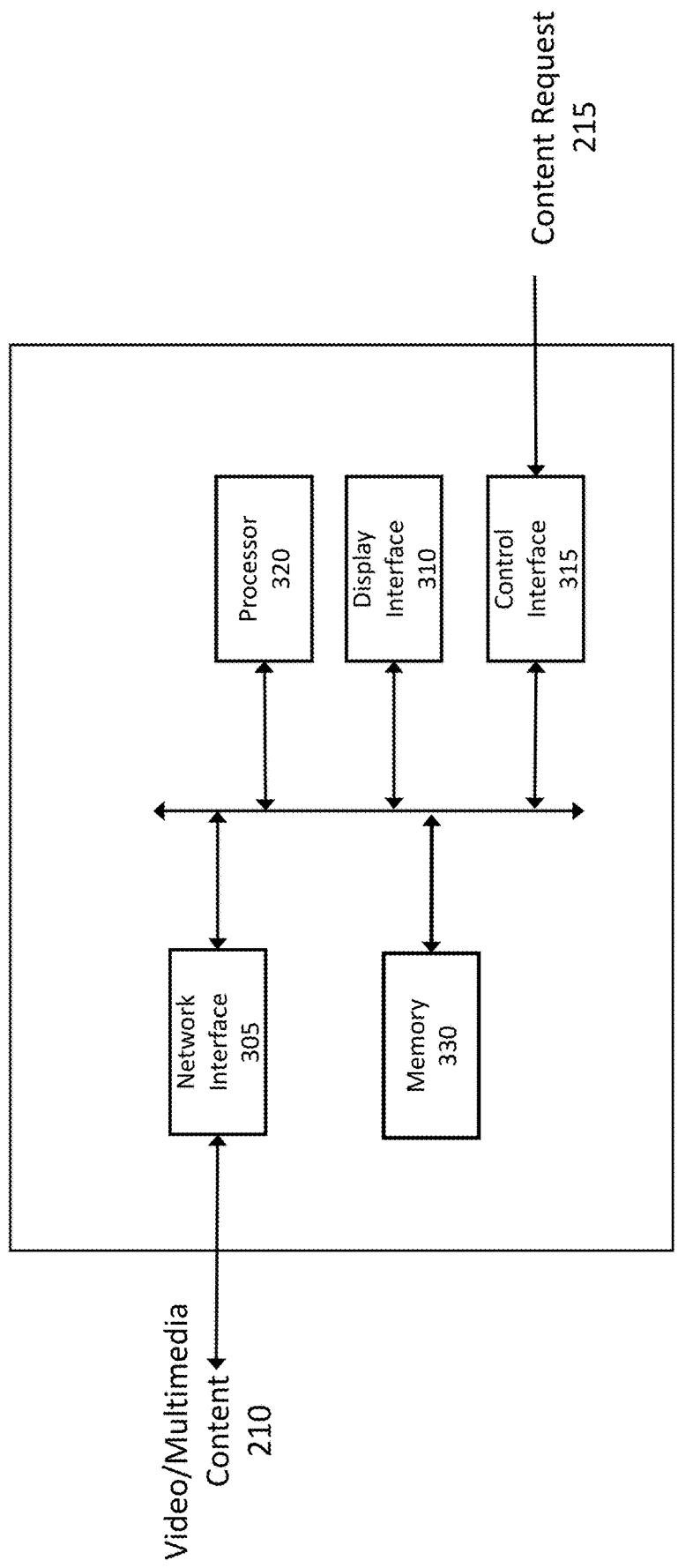
FIG. 3 is a block diagram illustrating an exemplary multimedia device 105 operable to display an electronic program guide in a bullet screen format according to an exemplary embodiment of the present disclosure.

FIG. 3 is a block diagram illustrating an exemplary multimedia device 105 operable to display an electronic program guide in a bullet screen format according to an exemplary embodiment of the present disclosure. The multimedia device 105 may include a network interface 305, a display interface 310, a control interface 315, a processor 320, and memory 330 or any other combination of hardware and software components as desired.

The memory 320 may store data and/or information that maps request or control signals generated by the RCU 135 to a specified action or function. In addition, the multimedia device 105 may store electronic program guide (EPG) data received from the content provider in the memory 330 or in a location on the network 115, 120, 125. According to an exemplary embodiment, the request for displaying the EPG in a bullet format can be mapped in memory 330 to a specific key or key combination or data signal generated by the RCU 135.

According to an exemplary embodiment, the network interface 305 can be configured to receive video content and electronic programming guide data from a content provider over the network 120, 125. The network interface 305 may include one or more tuners, wherein each of the one or more tuners may be tuned to a channel to receive content carried over the channel. Each tuner may be tuned to a frequency that is associated with a certain channel, and the frequency to which each tuner is tuned may be controlled by requests received from user input to the multimedia device 105 or requests received from one or more client devices 110. Channel requests can be facilitated through a request or command initiated by a user via the RCU 135. According to an exemplary embodiment, the multimedia device 105 may have buttons located on its housing, or the user may use the RCU 135 for example. The EPG data 205 stored in memory 330 associates a channel number identifier with additional data or information related to or describing the broadcast video or multimedia content. For example, the additional information may include a title of the content, broadcasting network identifier, film rating, content length (e.g., hours, minutes, seconds, etc.), content description, viewer rating, and any other information as desired.

The processor 320 can be configured to control the operation of the multimedia device 105, which includes generating a data signal for overlaying the electronic program guide data onto the video content according to a bullet screen format. For example, the processor 320 can be configured to assemble and/or arrange the electronic program guide data into a text stream for display in a bullet screen or bullet screen format on the client device 110. In an exemplary embodiment of the present disclosure, the properties of the bullet screen and the EPG data which is displayed can be associated with a single subscriber account or default profile or have a plurality of user profiles associated with a subscriber account. For example, the multimedia device 105 can be configured to enable viewing of video content according to one or more user profiles. Each user profile can have various settings in which user preferred channels and video content are defined. According to an exemplary embodiment, when profile based viewing is enabled, the multimedia device 105 may respond to channel change requests (e.g., "channel up," "channel down," etc.) by tuning or otherwise outputting only those channels that are included within a profile channel list of a user profile. While profile based viewing is enabled, the multimedia device 105 may respond to an electronic program guide request (e.g., guide request) by compiling program information from memory 330 that is associated with only those channels included within a profile channel list of a default profile, and the compiled program information may be output to a display device as a guide showing only those channels within the profile channel list. According to an exemplary embodiment profile based viewing can be disabled to allow the viewing and accessing of information for channels that are not included in a profile channel list.

According to an exemplary embodiment as shown in FIG. 3 a content request (e.g., a request for live or stored content received from a designated channel or received in an IP packet stream) can be received through the control interface 315 as a key code or a uniform resource identifier (URI) request that is delivered from a client device 110 or a remote control unit (RCU) 135 via an infrared (IR), radio frequency (RF), or other type of signal. The content request may identify a channel over which content is to be retrieved and output by the multimedia device 105.

According to an exemplary embodiment, the network interface 305 may provide one or more tuners which allow the multimedia device 105 to be tuned to different channels. In embodiments, a user request can cause the network interface 305 to reserve a tuner for a period of time during which the tuner is to be tuned to a channel specified in the user request (e.g., where a user schedules a program to be recorded at the multimedia device 105 or an associated client device 110). Content received at the multimedia device 105 may be output to one or more displays or one or more client devices 110 through the display interface 310. It should be understood that the network interface 305 may include any interface configured to receive one or more services (e.g., data, video content, etc.) delivered to the multimedia device 105 as a signal or communication.

The multimedia device 105 can be configured to deliver video content signals using IP multicast information. The multimedia device 105 and any companion devices as desired may include devices that facilitate switched digital video, broadcast video (over-the-air or cable), and/or real-time feeds. The multimedia device 105 can output content to client device 110, such as a display device over a wireless or wired RF link, such as a coaxial cable. According to an exemplary embodiment, the multimedia device 105 may deliver content over a composite video link, a component video link, a digital video link, a high-definition multimedia interface (HDMI), a wireless link or other type of known video link, video transmission standard or protocol as desired.

Figure 4A:
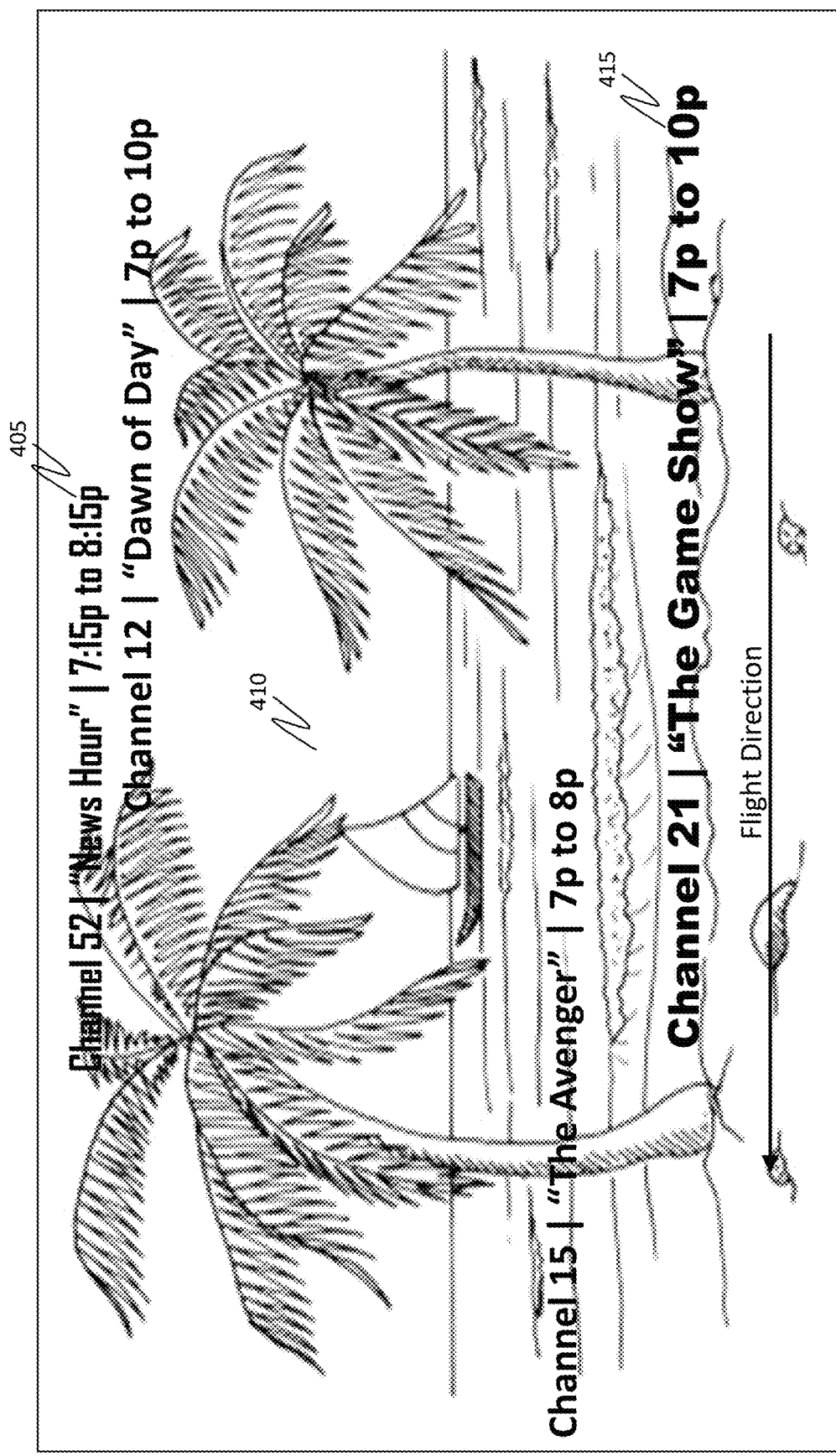
FIGS. 4A to 4C illustrate a display and display settings of an electronic program guide in a bullet screen format according to an exemplary embodiment of the present disclosure.
Figure 4B:
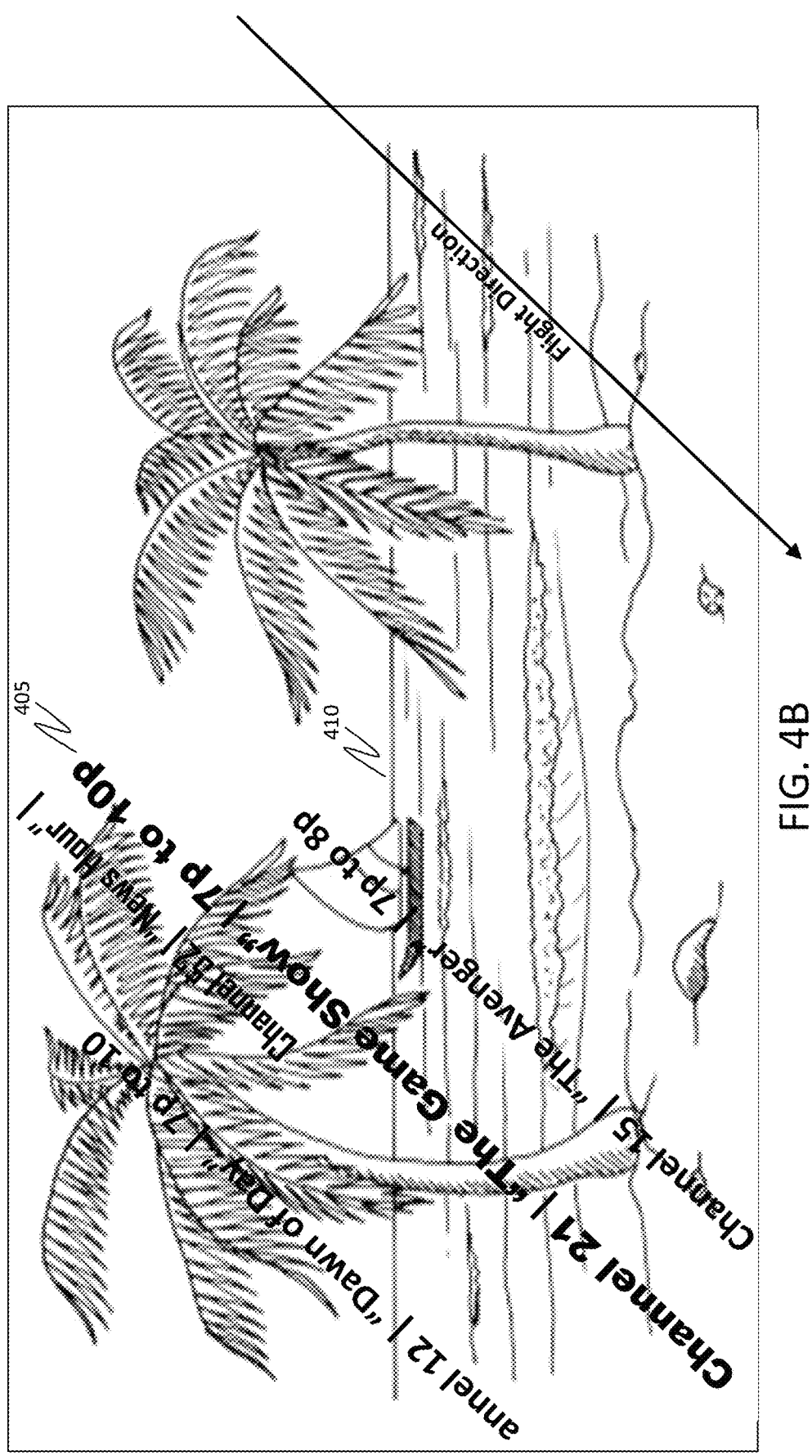
Figure 4C:
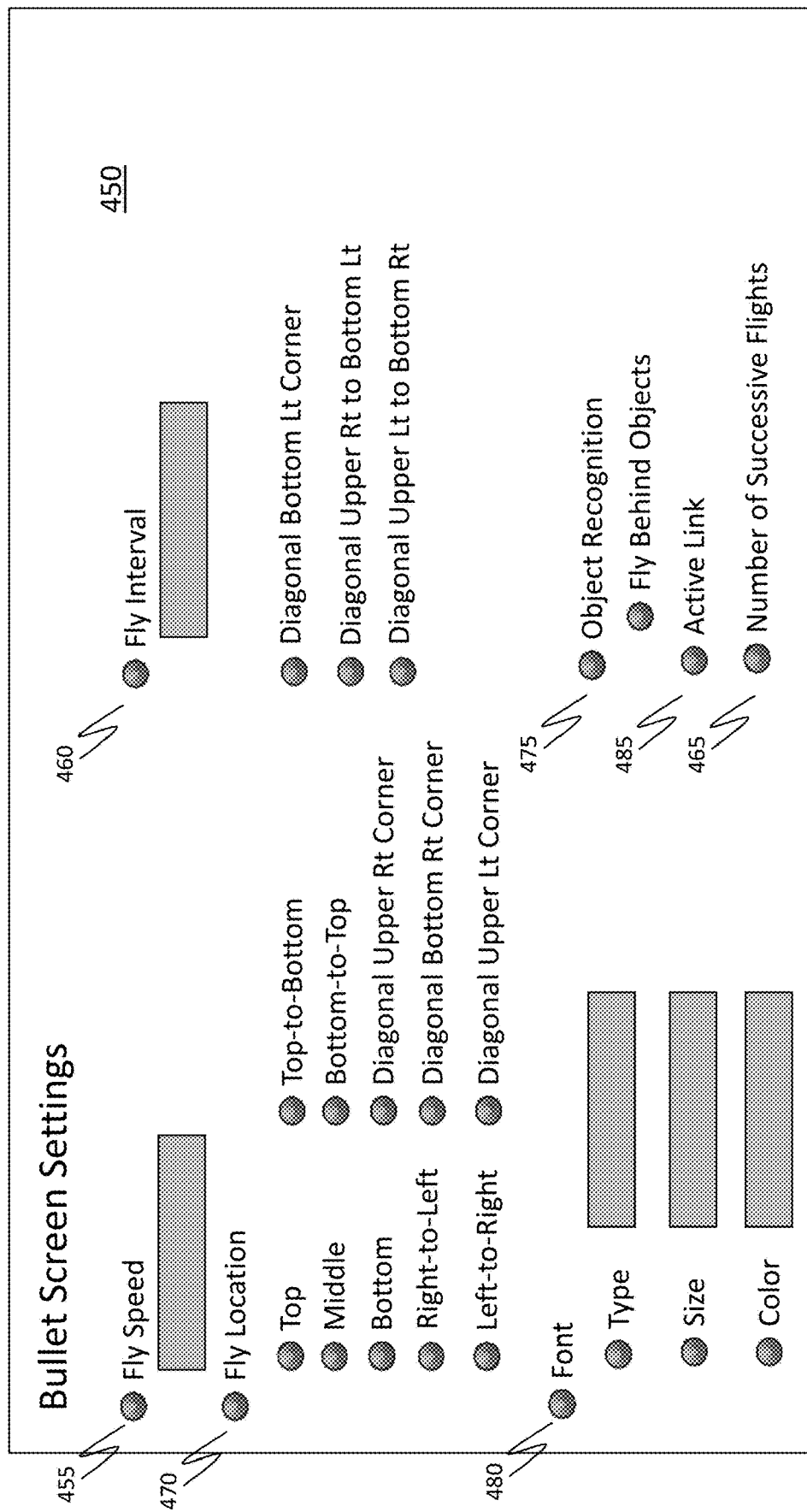

FIGS. 4A to 4C illustrate a display 400 and display settings 450 of an electronic program guide in a bullet screen format according to an exemplary embodiment of the present disclosure.

According to an exemplary embodiment, the multimedia device 105 can assemble and/or arrange the electronic program guide data stored in memory into a text stream for display in the bullet screen format. The information that is to be included in the text stream is configurable by a user. According to exemplary embodiments of the present disclosure, a user profile can be used to configure the bullet screen format. For example, a user profile can be used to specify a fly speed, fly interval, fly location, font properties 480 (e.g., font size, font type, font color), and any other parameter for displaying the bullet screen as desired. The fly speed 455 specifies the rate at which a text stream or text banner in which the EPG data is displayed scrolls or moves across the display, for example from one edge of the screen to the other. In an exemplary embodiment, the fly speed can be set to a rate of between 1 and 30, where 30 is the fastest rate. The fly interval 460 specifies the time between the flights of each EPG programming bullet. The fly interval 460 can be a global setting applied to all EPG bullets or individual settings for one or more of the EPG bullets 405. For example, the fly interval 460 for an EPG bullet 405 providing programming information for "Channel 21" can be set within a range of 1-5, where 5 is the shortest time between each repeat or successive flight of an EPG bullet 405. According to an exemplary embodiment, user profile can also allow for configuring a number of repeat or successive flights 465 for each EPG bullet 405 before the display is terminated. According to yet another exemplary embodiment, the EPG bullets 405 will repeat until the multimedia device 105 receives a termination or pause command from the user via the RCU 135, for example. The fly location 470 specifies the top, middle, or bottom portion of the screen through which the bullets will scroll or fly. For example, a default fly location can specify the bullet fly from the left edge of the screen to the right edge. However, the fly location 470 can be configured to move from the right edge to the left edge, from the top edge to the bottom edge, or from the bottom edge to the top edge. According to another exemplary embodiment, the fly location 470 can be configured to allow the EPG bullets 405 to fly from the left or right edge to the bottom or top edge in a diagonal manner. According to yet another exemplary embodiment, the fly location can be configured to take an irregular path from the one edge to another edge. For example, the flight can take a curved path from one edge to the other. The user profile can also be used to configure the bullet screen by setting a number of EPG bullets which can be displayed on the screen at any one time. For example, the bullet screen can be configured to display or scroll a specified number of EPG bullets, such as 5 or 10, at any time. According to an exemplary embodiment, the bullets can be configured to be displayed in a static state such that they do not move across the display screen. In this embodiment, each bullet may have a unique animation or color to distinguish from other bullets.

According to yet another exemplary embodiment, a property of the bullet screen can be configured to specify whether the EPG bullets fly over (e.g., in front of) or behind certain objects in the video content of the channel broadcast. For example, in setting the EPG bullets to fly behind objects in the video signal, the processor can be configured to recognize one or more objects 475 in the video content displayed on the display device. The recognized objects can include an actor or any portion of an actor's body such as a face, hand, hair, head, foot, leg, arm or any other body part or portion of a body part. The object can also an animal, vehicle, plant, tree, or any other object or combination of objects which may be a focus or focal point of the scene being displayed. The processor 320 can be configured to recognize objects according to image processing tools and/or algorithms. According to an exemplary embodiment, object recognition can also be realized from information provided in metadata or other descriptive data encoded in the video signal. According to yet another exemplary embodiment, the processor 320 of the multimedia device 105 can be configured to perform object recognition using a combination of object recognition tools and metadata. The multimedia device 105 can be configured to store in memory 330 or in a location on the subscriber network 125, the identity, type, and location of objects recognized in a video signal of a respective channel, so that the recognition process can be avoided for any subsequent viewing of the content.

Figure 4D:
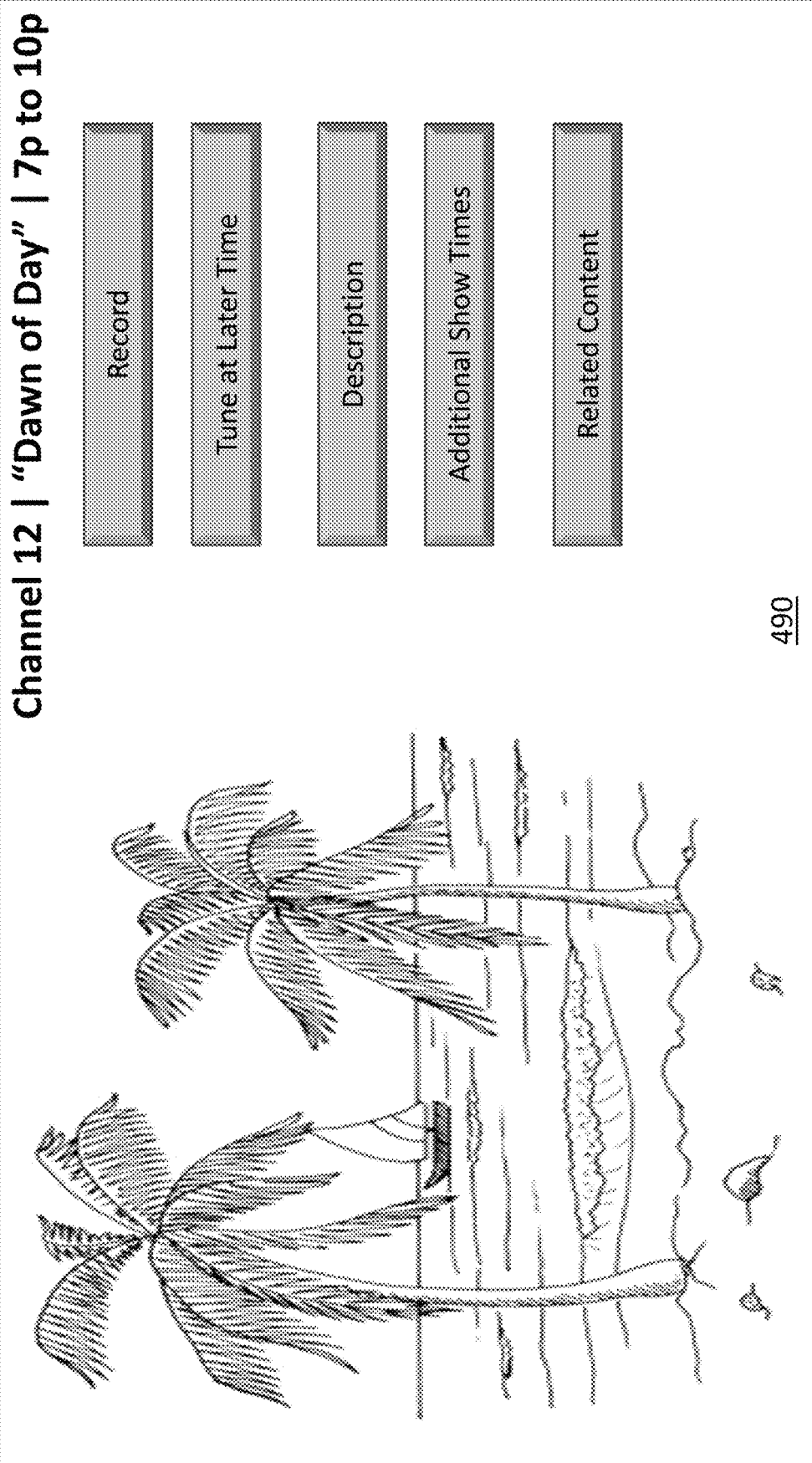
FIG. 4D illustrates an electronic program guide bullet link in accordance with an exemplary embodiment of the present disclosure.

FIG. 4D illustrates an electronic program guide bullet link in accordance with an exemplary embodiment of the present disclosure.

According to an exemplary embodiment, bullet screen may be configured such that the text stream or banner of the an EPG bullet 405 is an active or activatable link or icon 485, which when selected can instruct the multimedia device 105 to open a window 490 for viewing programming information of the channel and content associated with the selected EPG bullet. Further, the window opened via activation of the EPG bullet 405 can include additional active or activatable links or icons for initiating a request for the multimedia device 105 to immediately tune to the respective channel associated with the selected EPG bullet, record the video content currently being broadcast or which will be broadcast in the future for later viewing, or automatically tune to the associated channel at the at the time the video content is scheduled to be broadcast by the content provider. According to yet another exemplary embodiment, an EPG bullet when selected can generate a request or command instructing the multimedia device 105 to immediately tune to the associated channel. The multimedia device can be configured to initially display the channel content within a window having one or more sections for displaying information describing the video content currently being broadcast, and for displaying one or more active links for configuring the multimedia device to initiate a recording of the video content for later playback through a digital video recorder (DVR) feature, automatically tuning to the associated channel at the time the video content is scheduled to be broadcast by the content provider, or any other features for viewing or accessing video content from the content provider as desired.

Figure 5:
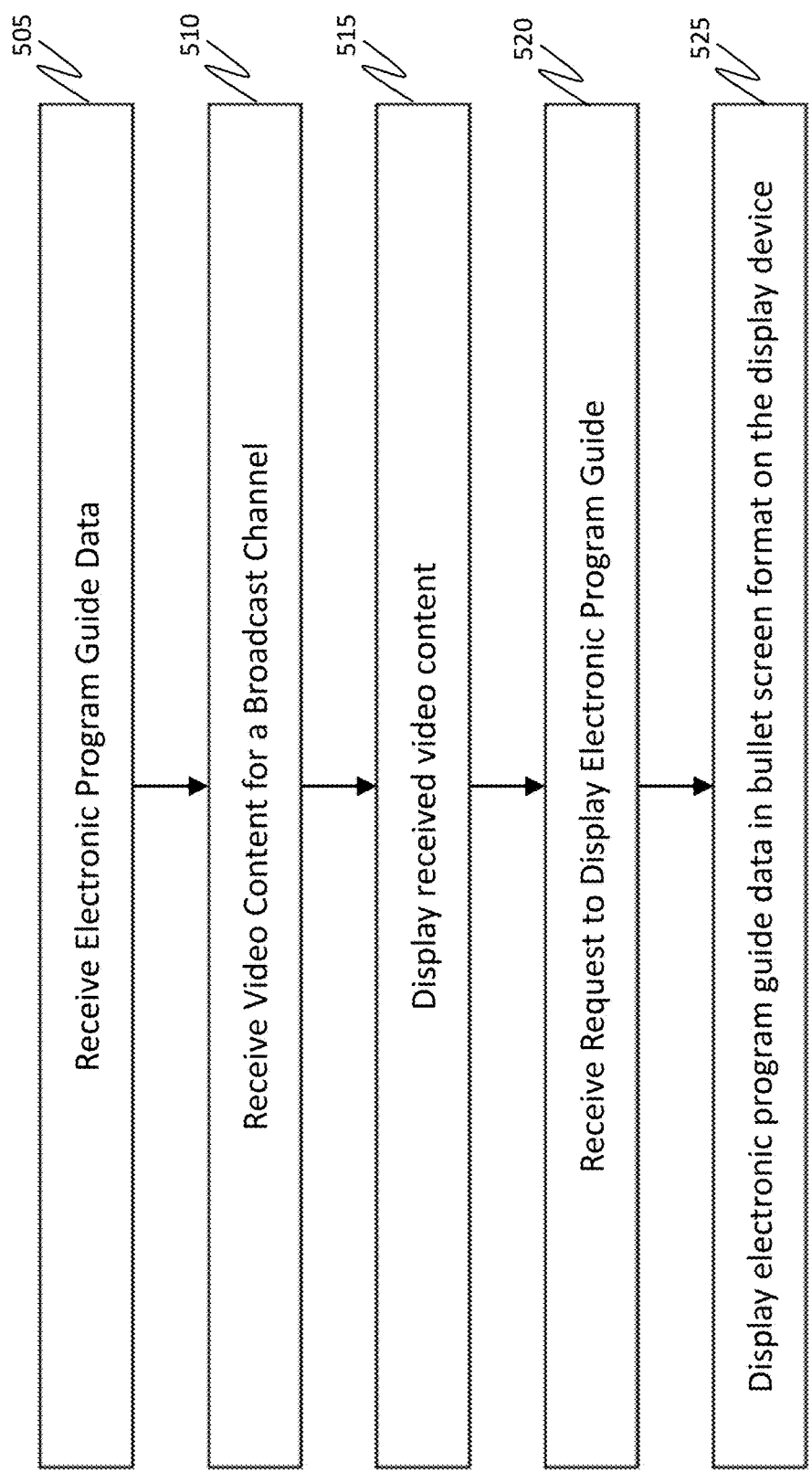
FIG. 5 illustrates a method for displaying an electronic program guide in a bullet screen format in accordance with an exemplary embodiment.

FIG. 5 illustrates a method 500 for displaying an electronic program guide in a bullet screen format in accordance with an exemplary embodiment.

As shown in FIG. 5, the multimedia device 105 can receive electronic program guide data over a network 120, 125 from a content server (step 505). The electronic program guide (EPG) data can include information associated with one or more channels through media or video content is broadcast. The EPG data can be stored in memory 230 of the multimedia device 105 or can be stored in a location on the local, subscriber, or WAN networks 115, 120, 125. The multimedia device 105 can also be configured to receive video content associated with one or more broadcast channels of the content provider (step 510). The received video content for a selected broadcast channel can be displayed on a display or client device 110 (step 515). While the video content for the selected broadcast channel is being displayed, the multimedia device can receive a request form a user to initiate display of the EPG data on the display device (step 525). According to an exemplary embodiment, the request can be initiated via an RCU or an input device connected to or integrated into the multimedia device 105. The processor 220 of the multimedia device 105 can display EPG content in a bullet screen format on the client device 110, wherein the electronic program guide content is overlaid on at least a portion of the video content in one or more text streams. In displaying the content in a bullet screen format, the processor 320 assembles or arranges the electronic program guide data into a text stream. The properties of the text stream in the bullet screen format are determined by the user selected parameters as shown in FIG. 4C.

Figure 6:
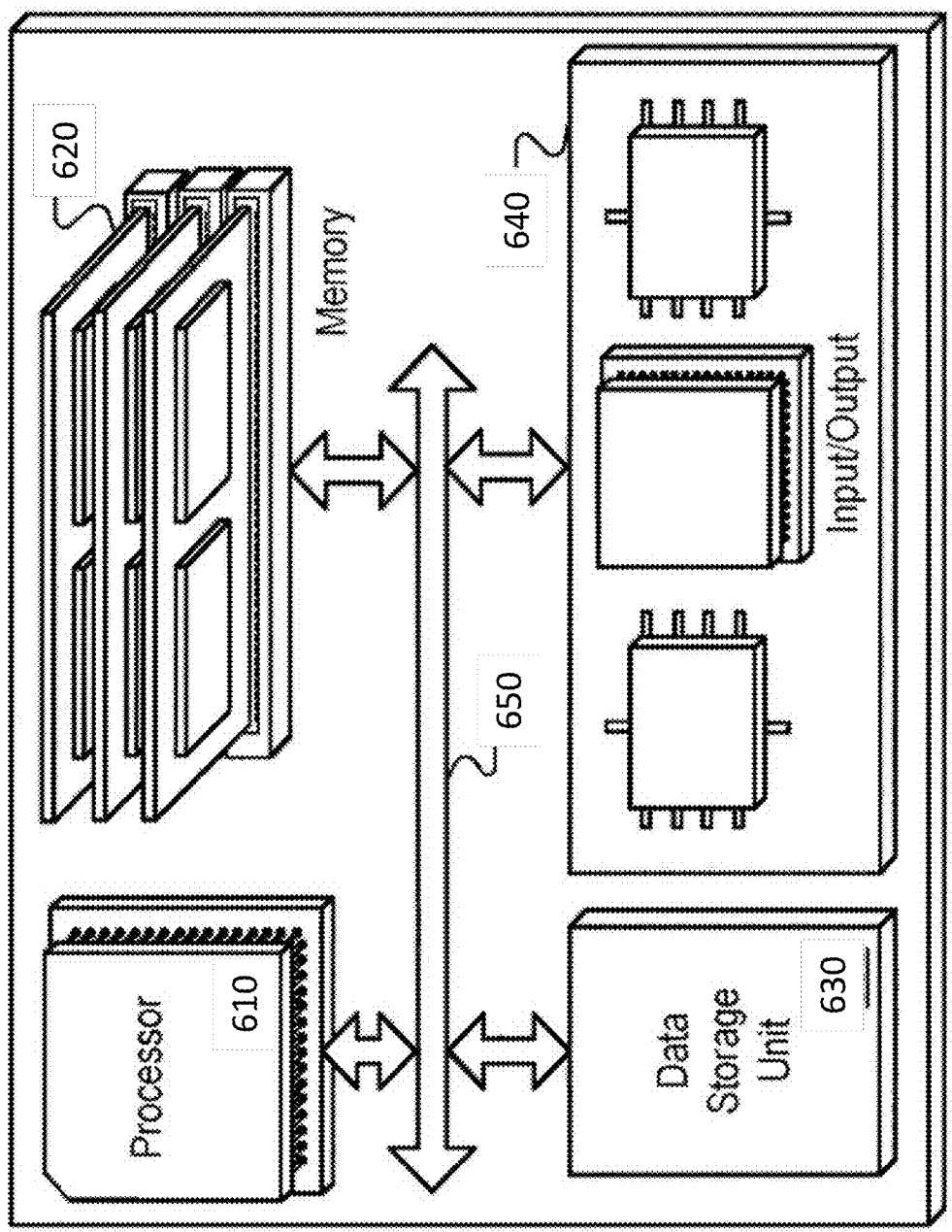
FIG. 6 is a block diagram of a hardware configuration operable to facilitate the display of an electronic program guide in a bullet screen format in accordance with an exemplary embodiment of the present disclosure.

FIG. 6 is a block diagram of a hardware configuration 600 operable to facilitate the display of an electronic program guide in a bullet screen format in accordance with an exemplary embodiment of the present disclosure. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 800. In embodiments, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, STB, etc.). In embodiments, the input/output device can include driver devices configured to send communications to, and receive communications from one or more networks (e.g., subscriber network 120 of FIG. 1, WAN 115 of FIG. 1, local network 115 of FIG. 1, etc.).

According to exemplary embodiments the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier for execution by, or to control the operation of, data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be In some embodiments, an apparatus or device embodying the invention may be in the form of a gateway, an access point, a set-top box or other standalone device, or may be incorporated in a television or other content playing apparatus, or other device, and the scope of the present invention is not intended to be limited with respect to such forms.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the preceding discussion used Wi-Fi and/or Ethernet communication protocols as illustrative examples, in other embodiments a wide variety of communication protocols and, more generally, adaptive balancing techniques may be used. Thus, the adaptive balancing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the adaptive balancing technique may be implemented using program instructions, operating system (such as a driver for interface circuit) or in firmware in an interface circuit. Alternatively or additionally, at least some of the operations in the adaptive balancing technique may be implemented in a physical layer, such as hardware in an interface circuit.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art.

What is claimed is:

1. A method for generating an electronic programming guide, the method comprising:
    receiving, at a multimedia device, from a content server, electronic program guide data over a network;
    receiving, from the content server, video content for a broadcast channel over the network;
    displaying the received video content on a display device of the multimedia device;
    receiving, from a user device, a request to display electronic program guide data on the display device;
    recognizing, by a processor of the multimedia device, a combination of different objects in the video content displayed on the display device;
    determining, by the processor of the multimedia device, that text bullets fly behind combination of different objects based on user-specified properties; and
    displaying, electronic program guide data in a bullet screen format on the display device, wherein each program in the electronic program guide data is displayed as a text bullet overlaid on a portion of the video content but behind the recognized combination of different objects based on additional user-specified properties including at least fly interval, which is set on a bullet-per-bullet basis and specifies a time between repeat or successive flights of a particular bullet,
    wherein at least one text bullet is an activatable link, which upon selection, instructs the multimedia device to open a window in which programming information of a particular channel and content associated with the selected text bullet is displayed, and
    wherein the window opened via activation of the at least one text bullet includes a plurality of additional activatable links, including at least (1) a first additional activatable link that, upon selection, initiates a request for the multimedia device to immediately tune to a respective channel associated with the selected text bullet, (2) a second additional activatable link that, upon selection, records video content, and (3) a third additional activable link that, upon selection, provides additional show times.

2. The method of claim 1, further comprising:
    assembling the text bullet to include a text stream for display in the bullet screen format.

3. The method of claim 1, further comprising:
    configuring the electronic program guide data to display each text bullet according to a user profile.

4. The method of claim 1, further comprising:
configuring properties of the bullet screen format to display each text bullet according to at least one of a fly speed, fly location and the user-specified fly interval.

5. The method of claim 1, wherein the user-specified properties of the bullet screen format are configurable in a user profile.

6. The method of claim 1, further comprising:
receiving a request to terminate display of at least one of the text bullets of the electronic program guide data.

7. The method of claim 1, wherein the electronic program guide data includes data associated with video content for current viewing or future viewing.

8. The method of claim 1, wherein each text bullet is displayed statically in the bullet screen format.

9. The method of claim 1, wherein each text bullet flies in a specified direction on the display device.

10. The method of claim 9, further comprising:
receiving a request to pause flight of at least one text bullet in the bullet screen format on the display device.

11. The method of claim 1, wherein each text bullet includes at least one of a channel identifier, content identifier, a content rating, a scheduled start time, and a scheduled stop time.

12. A device for displaying an electronic program guide, comprising:
a memory configured to store electronic program guide data;
a first interface configured to receive, from a content server, video content of a broadcast channel over a network;
a display device configured to display the video content received from the content server; and
a processor configured to:
receive, from a user device, a request to display electronic program guide data on the display device,
recognize a combination of different objects in the video content displayed on the display device,
determine that text bullets fly behind the combination of different objects based on user-specified properties, and
combine the electronic program guide data in a bullet screed format and the video content, wherein the electronic program guide data is displayed as a text bullet overlaid onto a portion of the video content but behind the recognized combination of different objects based on additional user-specified properties including at least a fly interval, which is set on a bullet-per-bullet basis and specifies a time between repeat or successive flights of a particular bullet,
wherein at least one text bullet includes an activatable link, which upon selection, instructs the processor to open a window in which programming information of a particular channel and content associated with the selected text bullet is displayed, and
wherein the window opened via activation of the at least one text bullet includes a plurality of additional activatable links, including at least (1) a first additional activable link that, upon selection, initiates a request for the multimedia device to immediately tune to a respective channel associated with the selected text bullet, (2) a second additional activable link that, upon selection, records video content, and (3) a third additional activable link that, upon selection, provides additional show times.

13. The device of claim 12, comprising:
a second interface configured to receive the request for displaying the electronic program guide data.

14. The device of claim 13, wherein the second interface is configured to receive a request to terminate display of at least one of the text bullets.

15. The device of claim 12, wherein the processor is configured to assemble at least one of the text bullets as a text stream for display in the bullet screen format.

* * * * *